Patented Sept. 13, 1949

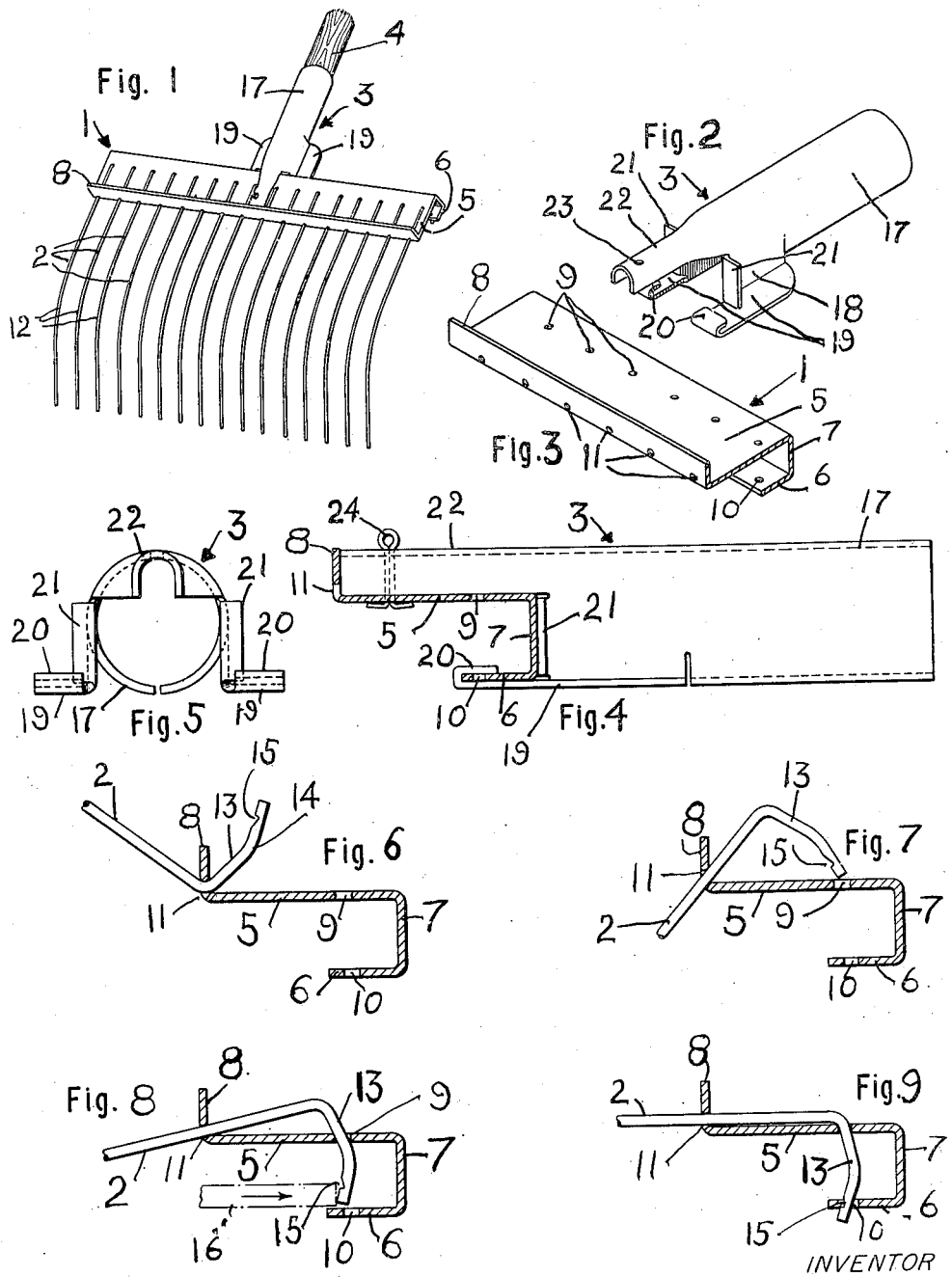

2,481,697

UNITED STATES PATENT OFFICE 2,481,697

BROOM RAKE

George H. Sharpe, Newton Centre, Mass.

Application June 12, 1946, Serial No. 676,305

5 Claims. (Cl. 56—400.17)

1

This invention relates to wire rakes such as are used for raking lawns or gravel surfaces of driveways, walks, and the like.

One object of the invention is to provide a novel construction for a rake of this type in which the teeth may be readily removed from the head if any of them become broken or damaged, and in which any tooth can be as readily installed in the head.

A further object of the invention is to provide a novel rake construction according to which the different parts of the rake, that is, the teeth, the head, and the handle socket, can be readily assembled by anyone, thus making it possible to sell the pieces comprising the rake in disassembled condition and in a small package, the matter of assembling the various pieces of the rake to make a complete rake being done by the purchaser.

In order to give an understanding of my invention, I have illustrated in the drawings a selected embodiment thereof which will now be described, after which the novel features will be pointed out in the appended claims.

In the drawings:

Fig. 1 is a perspective view of a rake embodying my invention.

Fig. 2 is a perspective view of the handle socket for the rake.

Fig. 3 is a perspective view of the rake head.

Fig. 4 is a view showing the rake head and the handle socket assembled, the rake head being shown in transverse section.

Fig. 5 is a front end view of the handle socket.

Figs. 6, 7, 8, and 9 are fragmentary sectional views showing the manner in which each individual tooth is assembled with the rake head.

My improved rake comprises a head element 1, a plurality of teeth 2, which are preferably made of wire, a handle receiving socket 3, and a handle 4.

The head element 1 is preferably made of sheet metal which is bent to form the upper member 5 and the lower member 6, which members are connected by the connecting portion 7, said upper and lower members 5 and 6 occupying parallel but spaced-apart planes.

The front edge of the upper member 5 is bent upwardly to form a tooth-positioning flange 8.

The upper member 5 of the head is provided with a plurality of apertures 9, one for each tooth 2 of the rake, said apertures being situated relatively near the connecting portion 7 of the head. The lower member 6 is also provided with a plurality of apertures 10, there being one aperture

2

10 in the lower member for each aperture 9 in the upper member, the two corresponding apertures 9 and 10 in the upper and lower members constituting mating apertures.

The flange 8 is also provided with tooth-positioning apertures 11 which are preferably situated at the base of the flange where it joins the upper member 5, there also being a tooth-positioning aperture 11 for each tooth and for each of the apertures 9 of the upper member 5.

Each tooth 2 is preferably made of wire, the body of which may be curved slightly as shown at 12. The rear end 13 of each tooth 2 is bent into a position substantially at right angles to the body of the tooth, and each bent end 13 is preferably curved slightly as shown at 14 and is provided near its end with a notch 15.

In assembling each tooth with the head, the bent end 13 thereof is inserted through one of the apertures 11 as shown in Fig. 6, and the tooth is then turned into the position shown in Fig. 7 and is inserted far enough through the aperture 11 so that the free end of the bent portion 13 of the tooth is positioned directly over the corresponding aperture 9 in the upper member 5 of the head. The apertures 11 in the flange 8 are of sufficient size to permit such movement of each tooth.

When each tooth has been manipulated into the position shown in Fig. 9, then it is further manipulated to cause the free end of the bent end 13 to enter through the aperture 9 in the upper member of the head as shown in Fig. 8.

Each two mating apertures 9 and 10 in the upper and lower members 5 and 6 of the head have such relation to the shape of the bent end 13 of the tooth that when the tooth is brought into the position shown in Fig. 8, the free end of the bent end portion 13 of the tooth will be positioned slightly in front of the corresponding aperture 10.

To effect the final assembly of the tooth with the head, the end of the bent portion 13 of the tooth is forced backwardly by the application thereto of a suitable tool 16 shown in dot-and-dash lines, Fig. 8, thereby to spring or bend the bent portion 13 of the tooth sufficiently to aline the end of said bent portion with the aperture 10, and when this has been done, the tooth is further manipulated to insert the end of the bent portion 13 through said aperture 10 as shown in Fig. 9.

The wire from which these teeth are made is sufficiently resilient to permit the end portion 13 of each tooth to be thus bent or deflected for the purpose of entering the end of the bent portion 13 into the aperture 10. When the parts are assembled as shown in Fig. 9, the resiliency of the bent portion 13 of the tooth will press the lower end of the tooth against the front edge of the aperture 10 so that said edge of the aperture engages in the notch 15 of the tooth, thereby locking the tooth in position.

The teeth are held in their parallel relation by means of the apertures 11, and when the rake is in use, any pressure against the free ends of the teeth will tend to hold the rear end of the body portion firmly in contact with the upper surface of the upper member 5, and the engagement of the edge of the aperture 10 in the notch 15 will serve to prevent any tooth from becoming dislodged from its aperture by any force applied to its free end.

If any tooth becomes broken, it can be readily removed from the head by pressing backwardly on the lower end of the bent portion 13 of the tooth to disengage the notch 15 from the edge of the opening 10 and then manipulating the broken tooth so as to withdraw the bent portion 13 thereof first from the lower aperture 10 and then from the upper aperture 9. When the broken tooth has been manipulated into this position, which would be the position shown in Fig. 7, then the tooth can be turned on its axis and swung into the position shown in Fig. 6, after which the bent end portion 13 can be readily removed from the aperture 11.

The handle-receiving socket 3 and the head 1 are so made that these two elements can be readily assembled by anyone without the use of any special tools.

The handle-receiving socket 3 is preferably made of sheet metal which is bent to form the circular handle-embracing portion 17 and to form the two downwardly directed portions 18, one on each side thereof, each downwardly directed portion having an outwardly extending horizontal wing 19 at its lower edge. Each wing extends forwardly beyond the downwardly directed portion 18, and the front edge of each wing 19 is bent back upon itself to form a lip 20 which is spaced slightly from the body of the wing.

The front edge of each downwardly directed portion 18 is bent laterally to form a bracing flange 21 adapted to engage the connecting portion 7 of the head.

The handle receiving socket 3 is also formed with a forwardly extending neck portion 22 adapted to overlie the upper member 5 of the head.

The handle-receiving socket 3 and the head 1 are so constructed that they can be assembled by sliding the head endwise into position relative to the socket 3 with the under member 20 resting on the wings 19 and the front edge of said under member sliding in under the lips 20 of the wings, the connecting member 7 of the head meanwhile engaging and sliding over the bracing flanges 21, and the neck 22 contacting with and sliding over the upper face of the upper member 5.

This operation of assembling the head 1 and the handle socket 3 is to be performed before the teeth have been assembled with the head.

The handle receiving socket 3 may be retained in position on the head by any suitable means. As herein shown, the neck 22 is provided at its front end with an aperture 23 adapted to receive a cotter pin 24 or other fastening device which extends through the neck and down through an aperture in the upper member 5 of the head, the ends of the cotter pin being bent over to lock the pin in place as shown in Fig. 4.

The neck 22 is preferably curved transversely as shown, thereby increasing its rigidity.

After the head and the socket member have been thus assembled and secured together, then the individual teeth may be assembled with the head as above described.

Attention is called to the fact that the assembly of the head and the socket member does not require the use of any special tools, and after the two parts have been thus assembled, they are locked in their assembled relation simply by the insertion of a cotter pin 24.

The manner in which the lips 20 of the wings 19 embrace the front edge of the lower member 6 of the head, and the manner in which the bracing flanges 21 engage the connecting member 7 of the head, maintains the head and the socket member rigidly in their assembled relation.

After the head and socket member have been assembled and secured together and the teeth 2 have been installed in the head, the rake may be completed by merely inserting the handle 4 into the handle receiving socket portion 17 of the socket member 3.

This matter of assembling the rake can easily be accomplished by anyone without the use of any special tools, thus making it possible for the rake to be sold to the customer in a knocked-down or disassembled condition and in a small package which is much easier to carry than a completely assembled rake with its long handle.

I claim:

1. A rake comprising a head having an upper member and a lower member occupying parallel but spaced-apart planes, each member having a plurality of apertures mating those of the other member, a plurality of wire teeth, each having its rear end bent substantially at right angles to the body thereof, the body portion of each tooth resting on the upper surface of the upper member of the head and the bent end of the tooth extending through an aperture in said upper member of the head and also through a mating aperture in the lower member of the head, and means at the front edge of the upper member of the head maintaining each tooth properly spaced from adjacent teeth, each pair of mating apertures having such relation to each other and the bent end portion of the corresponding tooth that said bent end portion is held under tension when it occupies said mating apertures.

2. A rake such as described in claim 1 in which the bent end portion of each tooth is provided with a notch in which the front edge of the corresponding aperture in the lower member of the head is located and in which it is held by the resiliency of said bent portion.

3. A rake comprising a head having upper and lower members parallel to but spaced from each other and connected at their rear edges by a connecting portion, said upper and lower members and the connecting portion presenting a channel shaped element, teeth mounted in said head, a handle-receiving socket provided with wings to underlie the lower member of the head, the ends of said wings being bent over to form lips which embrace the front edge of said handle-receiving lower member, said socket also having spaced bracing flanges extending at right angles to said wings and engaging the connecting member of the head, and further having a neck portion which overlies the top surface of the upper member of the head, and means securing said neck portion to the upper member of the head.

4. A rake comprising a channel shaped head made of sheet metal bent to present parallel upper and lower members and a connecting member, the front edge of the upper member being bent to provide an upstanding flange, said upper member having a plurality of apertures, one for each tooth, and the lower member having mating apertures, the upstanding flange also having apertures, one for each tooth, wire teeth extending through the apertures of the flange and having their rear ends bent at substantially right angles and extending through the mating apertures of the upper and lower members of the head, a handle socket element presenting two wing portions engaging the under side of the lower member of the head and having their ends bent over to form lips which embrace the front edge of said lower member, said socket member having spaced bracing flanges extending at right angles to the wings and engaging the connecting member of the head and also having a forwardly extending neck engaging the top surface of the upper member and abutting the upstanding flange, and means for connecting the neck to said upper member.

5. A rake comprising a channel shaped head having an upper member and a lower member parallel to but spaced apart from each other, the upper member having a plurality of apertures and the lower member having a corresponding number of apertures mating those of the upper member, a plurality of wire teeth, each having a body portion presenting a free forward end and also having its rear end bent substantially at right angles to the body portion thereof, said body portion of each tooth resting on the upper surface of the upper member and the bent rear end of each tooth extending through and occupying both an aperture in the upper member and a mating aperture in the lower member, each pair of mating apertures and the bent rear end of the tooth extending therethrough having such a relation that said bent end is held under stress in a direction away from the free end of the tooth.

GEORGE H. SHARPE.

REFERENCES CITED

The following references are of record in the file of this patent:

UNITED STATES PATENTS

| Number | Name | Date |
|---|---|---|
| 1,970,616 | Montan | Aug. 21, 1934 |
| 2,032,954 | Reichard | Mar. 3, 1936 |
| 2,156,480 | Owen | May 2, 1939 |
| 2,315,021 | Schmidt et al. | Mar. 30, 1943 |
| 2,365,393 | Connolly | Dec. 19, 1944 |